United States Patent [19]
Schropp et al.

[11] Patent Number: 6,028,512
[45] Date of Patent: Feb. 22, 2000

[54] ELECTRONIC BLINKER

[75] Inventors: Roland Schropp, Erlenbach; Andreas Fritz, Brackenheim, both of Germany

[73] Assignee: Temic Semiconductor GmbH, Heilbronn, Germany

[21] Appl. No.: 09/292,451

[22] Filed: Apr. 15, 1999

[30] Foreign Application Priority Data

Apr. 18, 1998 [DE] Germany .......................... 198 17 335

[51] Int. Cl.[7] .................................................. B60Q 1/52
[52] U.S. Cl. .......................... 340/471; 340/475; 340/472; 340/478; 307/10.8; 315/77; 315/200 A
[58] Field of Search ..................... 340/471, 472, 340/478, 661, 664, 475, 660, 662, 663, 458; 307/10.8; 361/86, 88, 90; 324/173, 207.12; 315/77, 200 A

[56] References Cited

U.S. PATENT DOCUMENTS

| 4,620,177 | 10/1986 | Hatanaka et al. ........................ 340/475 |
| 5,374,920 | 12/1994 | Evens ........................................ 340/475 |
| 5,805,061 | 9/1998 | Fritz et al. . |
| 5,929,569 | 7/1999 | Sucoka ..................................... 340/475 |

FOREIGN PATENT DOCUMENTS 4113455   10/1992   Germany .

*Primary Examiner*—Nina Tong
*Attorney, Agent, or Firm*—W. F. Fasse; W. G. Fasse

[57] ABSTRACT

An electronic blinker circuit for a vehicle has an analog relay control section (24) and a digital circuit control section (25) arranged in a housing having only eight terminals. A holding circuit in the digital circuit section prevents an unintended oscillation when relay contacts are opened while a manual warn-blinker switch is still closed. When the engine ignition is switched off the blinker circuit requires a low quiescent current flow that is typically only 10 $\mu$A.

8 Claims, 3 Drawing Sheets

ELECTRONIC BLINKER

FIELD OF THE INVENTION

The invention relates to an electronic blinker for performing a normal directional blinking function and a warn-blinking function in a vehicle.

BACKGROUND INFORMATION

U.S. Pat. No. 5,805,061 (Fritz et al.) discloses an electronic flasher unit 10 for a vehicle lighting system. The flasher unit 10 includes an integrated control circuit 16 for operating blinker lamps 19. The circuit 16 has an open-loop control input 6 and a relay driver output 1. Additional terminals 2, 3, 4, 5, 7 and 8 of the control circuit 16 will be described in more detail below. The control input 6 of the integrated circuit 16 is connected through a resistor $R_4$ to a hazard input terminal 13 which in turn is connected to a warn-blinker switch 20 that is manually operable. The relay driver output 1 is connected to one terminal of a relay 17 and provides a control signal for energizing the relay 17 to operate relay contacts 17' and 17". The other terminal of the relay 17 is connected through a terminal 15 with a reference potential such as ground. The operational mode "warn-blinking" is established when the switch 20 is closed. The relay contact 17' establishes a power supply circuit for two warn-blinking lamps 19 as follows: battery 23, terminal 14, shunt resistor $R_3$, relay contact 17' closed, terminal 13, warn-blinker switch 20, warn-blinking lamps 19, ground. A further power supply circuit is established through the relay contact 17" for one or the other blinker lamp 19' for right and left blinking depending on the position of the manually operable directional blinker switch 21.

When the warn-blinker switch 20 is closed, ground potential is temporarily applied to the control input 6 of the circuit 16 through the resistor $R_4$, the warn-blinker switch 20, and the warn-blinking lamps 19, whereby the integrated circuit 16 is switched into the operational mode "warn-blinking" and the relay 17 is energized. As soon as the relay 17 has closed its contact 17', the battery voltage is connected to the control input 6, through the terminal 14, the shunt resistor $R_3$, the contact 17', and the resistor $R_4$, whereby the operational mode "warn-blinking" is switched off. Since, however, the warn-blinker switch 20 remains closed, the operation mode "warn-blinking" is switched on again when the relay contact 17' is opened so that the integrated circuit 16 can assume an oscillating operational mode.

In order to prevent this oscillating operational mode, it is necessary that a signal holding circuit in the integrated circuit makes sure that the ground potential that has been connected to the control input 6 by the closing of the warn-blinker switch 20 is maintained as long as the warn-blinker switch 20 is closed.

German Patent Publication DE 4,113,455 C2 discloses an analog circuit arrangement having the required holding function, however, with the disadvantage that in the operational mode "warn-blinking" additional circuit components are required for maintaining the low level, namely a resistor $R_8$ integrated into the circuit IC, a second external shunt resistor $R_7$ and a comparator $K_1$. Since the comparator $K_1$ must be maintained in its active state even if the engine ignition is switched off in order to switch on the operational mode "warn-blinking" a quiescent current of typically 100 $\mu$A keeps flowing, which is undesirable for battery power preservation.

OBJECTS OF THE INVENTION

In view of the foregoing it is the aim of the invention to achieve the following objects singly or in combination:

to provide an electronic blinker for warn-blinking which avoids the above mentioned disadvantages;

to make do with an eight terminal integrated blinker control circuit while using one control terminal of the control circuit for two different functions without the conventionally used additional mechanical switches; and to substantially reduce the quiescent current flow to about 10% of the respective current flow in conventional circuits of this type, for example as disclosed in the above mentioned German patent application.

SUMMARY OF THE INVENTION

The above objects have been achieved by a vehicle blinker circuit combining the following features for a warn-blinking capability and a normal right-left blinking capability. An integrated control circuit includes an input comparator circuit with a warn-blinker input for comparing a switch-on signal from a warn-blinker switch with a threshold value. A voltage supply circuit is connected to a battery for providing an operating voltage to the electronic blinker. The control circuit includes a relay driver circuit with a relay driver output for controlling a blinker relay and a control unit for the timed open loop blinking control of light and dark phases of blinker lamps during blinking. The input comparator circuit is connected through a first conductor to the voltage supply circuit in response to the closing of the warn-blinker switch for supplying an operating voltage to the circuit. The input comparator circuit is further connected through the first conductor to a signal holding circuit for setting a holding signal during light phases when the warn-blinker switch is closed. The control unit is connected through a data bus to the relay driver circuit for controlling the timing sequence of the light and dark phases. The control unit is further connected through a second conductor with a signal holding circuit for resetting the holding signal when the warn-blinker switch is open. The signal holding circuit is connected through a third conductor to the voltage supply circuit for maintaining the operating voltage supply when the holding signal is set and for switching-off the operating voltage supply when said holding signal is reset.

The advantages of the invention are seen in that only a few external circuit components are required for the present electronic blinker. Further, with the exception of a few memory cells, all internal circuit components are switched off when the warn-blinker switch is switched off so that a quiescent current of only 10 $\mu$A is required for the present circuit arrangement.

BRIEF FIGURE DESCRIPTION

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
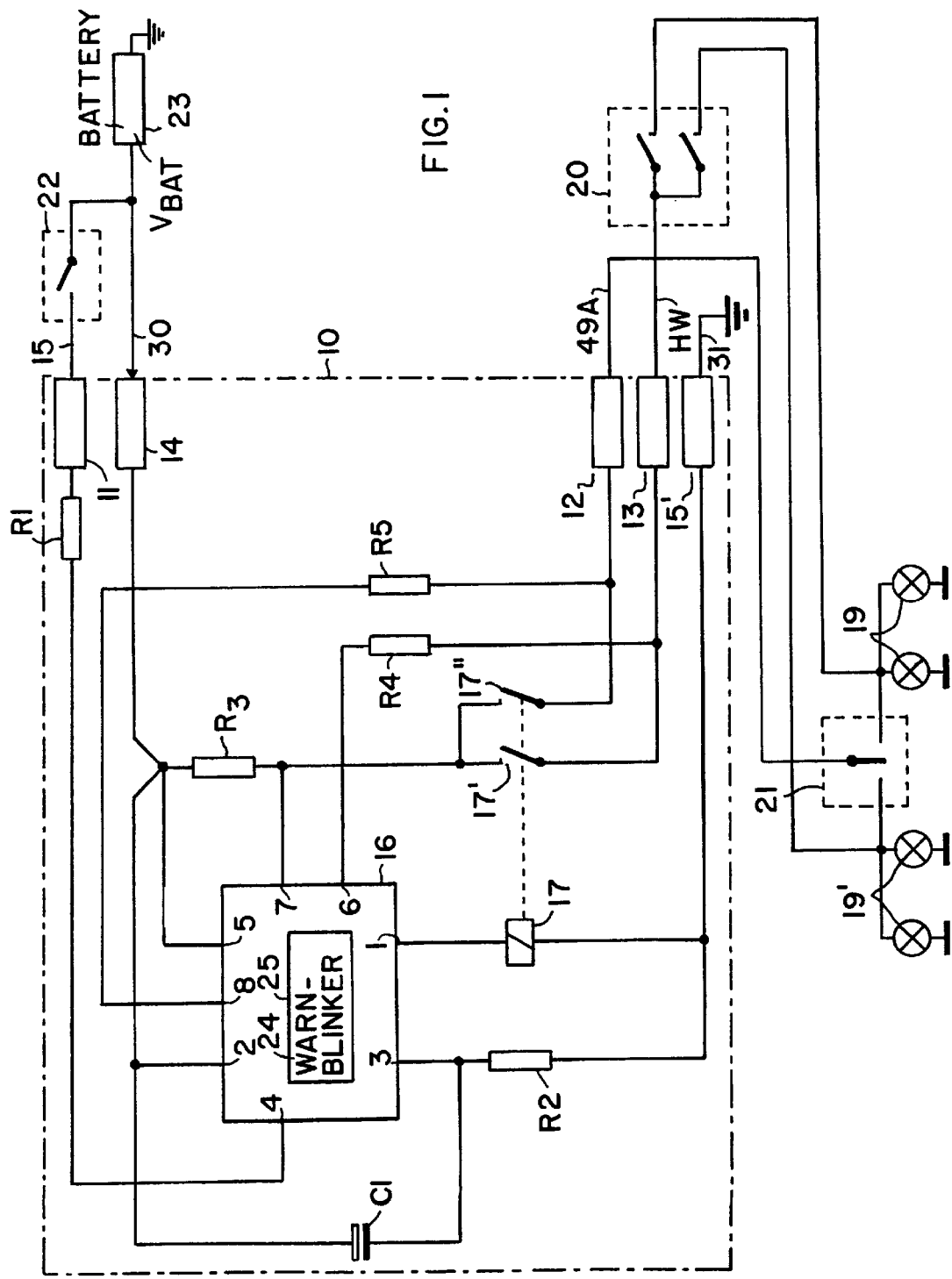
FIG. 1 is a block circuit diagram of an electronic blinker with an improved warn-blinker component integrated into the blinker control circuit.

FIG. 1 shows a block diagram wherein the electronic blinker 10 has three open-loop control inputs, namely an ignition input terminal 11, a directional blinker switch terminal 12, and a warn-blinker switch terminal 13. Terminal 11 is connected through a conductor 15 and an ignition switch 22 to a battery 23. Terminal 12 is connected through a conductor 49A to a manually operable directional blinker switch 21. Terminal 13 is connected through a conductor HW to a manually operable hazard switch 20. In addition to these three control input terminals 11, 12, and 13, further terminals are provided, namely the battery terminal 14 connected through a conductor 30 to the battery 23 and the reference potential input terminal 15' connected through a conductor 31 to ground. An integrated blinker control circuit 16 of the electronic blinker 10 has eight external connector terminals 1 to 8 which means that the circuit can be arranged in an eight terminal DIP-housing or in an SO8-housing.

The integrated control circuit 16 comprises, for example the following terminal pins: a so-called relay driver output 1, a terminal 2 for connection to the battery voltage $V_{batt}$ through the battery terminal 14, a terminal 3 for applying a reference potential to the integrated control circuit 16, an input 4 connected to the ignition terminal 11 of the ignition input switch 22, an input terminal 5 connected to the battery terminal 14, a warn-blinker input 6, a measuring input 7, and a directional blinker input 8. The battery voltage at the terminal 5 represents the reference potential for the measuring input 7. Instead of connecting the winding of a relay 17 to the relay driver output terminal 1, it is, for example possible to connect the gate of a power MOSFET to the terminal 1.

A capacitor C1 is connected to the terminals 2 and 3. The capacitor C1 functions as a support capacity when negative parasitic voltages occur. Ohmic resistors $R_1$, $R_2$, $R_4$ and $R_5$ are arranged in the conductors to the terminals 4, 3, 6 and 8 respectively for protection of the integrated circuit 16 against interference impulses and wrong polarity connections. A low ohmic resistor $R_3$ of, for example 20 mΩ, is used as a shunt and measuring resistor in the conductor between the battery terminal 14 and the measuring input terminal 7.

A blinker relay 17 functioning as a switch is connected to the terminal 1 of the integrated control circuit 16. The two relay contacts 17' and 17" of the blinker relay 17 activate blinker lamps 19 that form a circuit load, through the hazard or warn-blinker switch 20 or through the directional blinker switch 21. The ignition switch 22 and the vehicle battery 23 are connected to the terminal 11 as shown in FIG. 1. The circuit arrangement of the warn-blinker switch 20 must be capable of activating all four blinker lamps 19 and 19' even if the ignition switch 22 is switched off, as is conventional. Hence these circuit components are not shown in detail. Only the lamps 19 or the lamps 19' are activated for directional blinking.

Figure 2:
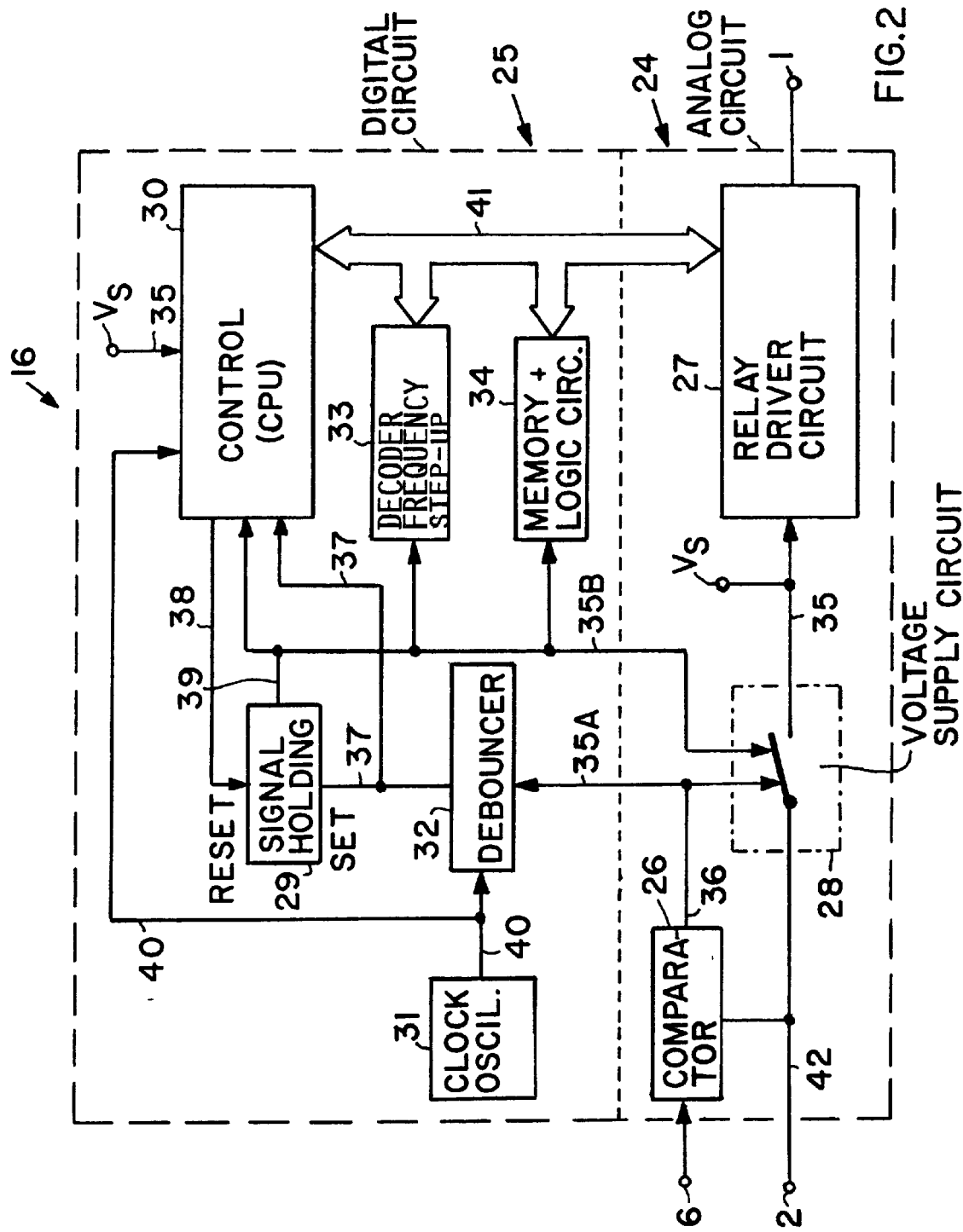
FIG. 2 shows circuit details of the present warn-blinker component forming part of the integrated blinker control circuit.

FIG. 2 shows the details of the warn-blinker improvement sections 24, 25 integrated into the circuit 16 of FIG. 1. This improvement is essential for the operational mode "warn-blinking" according to the invention. The improvement portion comprises an analog circuit section 24 and a digital circuit section 25. The analog circuit section 24 comprises an input comparator circuit 26 connected with the warn-blinker input 6 for comparing an input signal from the warn-blinker or hazard switch 20 with a predetermined threshold value when the operational mode "warn-blinking" is switched on by manually operating the switch 20. The analog circuit section 24 further comprises a relay driver circuit 27 providing the relay driver output 1 for energizing the relay 17 shown in FIG. 1. A voltage supply circuit 28 is also part of the analog circuit 24 and is connected through a conductor 42 to the terminal 2 which in turn is connected to the battery terminal 14 as shown in FIG. 1. A conductor 35 for supplying an operating voltage $V_S$, which may be the battery voltage $V_{BAT}$, to the analog circuit section 24 and to the digital circuit section 25 is connected to the circuit 28 shown as a switch in FIG. 2.

The most important circuit components in the digital circuit section 25 are a signal holding circuit 29, for example in the form of a digital flip-flop, and a control unit 30 comprising a timing sequence open loop control. The digital circuit section 25 further includes a clock signal generator 31, a contact debouncing or chatter preventing circuit 32 which, for example, comprises a plurality of series connected flip-flops with a corresponding intermeshing of their respective outputs. A frequency step-up circuit 33 including a decoder matrix for increasing the blinker frequency in the operational mode "directional blinking" when failed blinker lamps 19 are present (FIG. 1), is also provided in the digital circuit section 25. A logic circuit 34 with a memory for recognizing, for example, additional blinker lamps in a hitched-on trailer is also part of the digital circuit section 25, whereby a lamp failure control threshold is increased.

Conductors 36 and 35 connect the input comparator circuit 26 with the voltage supply circuit 28 and with the contact debouncing circuit 32. The signal holding circuit 29 is set by a signal supplied through a conductor 37 from the contact debouncing circuit 32. The signal holding circuit 29 is reset by a signal on a conductor 38 from a central control unit 30. The signal holding circuit 29 in turn supplies a signal through the conductors 39 and 35B to the central control unit 30, to the voltage supply circuit 28, to a frequency step-up circuit and decoder 33 and to the logic circuit 34 that includes a memory. The clock signal generator 31 supplies clock signals through a conductor 40 to the digital circuit sections, namely to the contact debouncing circuit 32 and to the control unit 30. The contact debouncing circuit 32 is also connected with the control unit 30 through a conductor 37. A databus 41 interconnects the relay drive circuit 27, the logic circuit 34 with its memory, the frequency step-up circuit 33 with its decoder matrix, and the central control unit 30 with one another.

Figure 3:
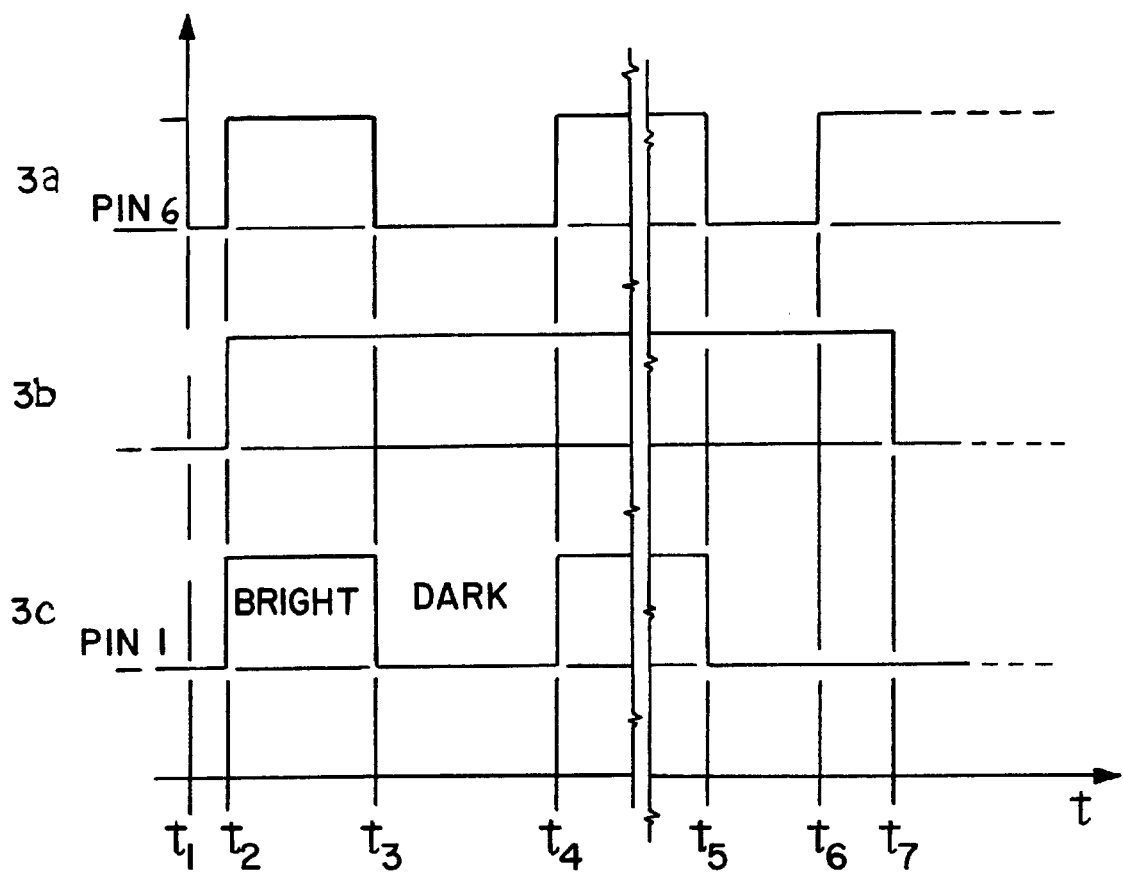
FIG. 3 shows three signal waveforms as a function of time at different terminals of the integrated blinker control circuit representing the operational mode "warn-blinking".

FIG. 3 illustrates signal waveforms as a function of time at different terminals of the integrated circuit 16 shown in FIG. 1 in the operational mode: "warn-blinking". The diagram 3A shows, as a function of time, the waveform at the warn-blinking input 6. The diagram 3B shows, as a function of time, the waveform at the output of the signal holding circuit 29 shown in FIG. 2. The diagram 3C shows, as a function of time, the waveform at the relay driver output 1.

Referring to FIGS. 1 to 3, the sequence of the operational mode "warn-blinking" will now be described, whereby it is assumed that the engine ignition is switched off.

When the warn-blinker switch 20 is switched off, the supply voltage $V_S$ is thereby switched off in the voltage supply circuit 28, whereby the circuit sections 27 to 34 are switched off with the exception of the input comparator circuit 26. When the warn-blinker switch 20 is closed, for example at a point of time $t_1$, the high level present at the warn-blinker input 6 of the integrated circuit 16, is temporarily set to the low level or mass potential through the resistor $R_4$, the warn-blinker switch 20 and the blinker lamps 19, 19'. As a result, on the one hand, the voltage supply circuit 28 which is switched off when the ignition is switched off, is activated by a signal on the conductor 36, whereby the supply voltage $V_S$ is provided for the circuit sections 27 to 34 of the integrated circuit 16. The signal on the conductor 36 is also supplied to the contact debouncing circuit 32 which supplies, through the conductor 37, a debounced holding signal 4 setting the signal holding circuit 29. The debounced signal is also supplied to the control unit 30 through the conductor 37. The control unit 30 now controls in open loop fashion all further operational sequences in accordance with a fixed timed program, especially the light and dark phases during blinking by supplying respective control signals to the relay driver circuit 27 through a databus 41.

The relay driver circuit 27 provides, for example at a point of time $t_2$, a signal to the blinker relay 17 through the output terminal 1, whereby the relay contacts 17' and 17" are closed and a current flows to the blinker lamps 19, 19' whereby the blinker lamps are energized and a lit phase begins. After a lapse of time, the duration of which is determined by the open loop time control, the lit phase is terminated by resetting the relay driver output 1 through the control unit 30 so that, for example at the point of time $t_3$, a dark phase begins, during which the blinker lamps 19, 19' are not energized.

It was mentioned above that a conventional integrated circuit without further measures would enter an unintended oscillating operation as soon as the blinker lamps 19, 19' enter a high ohmic state unless counter measures are taken. The invention prevents such unintended oscillation in that the high level in the signal holding circuit 29 is maintained as a holding signal, see waveform 3B. The high level at the holding circuit 29 was produced at the time of switch-on of the warn-blinker switch 20 supplying a short duration low signal. This high level holding signal, which is supplied through the conductor 39 to the voltage supply circuit 28, makes sure that the supply or operating voltage $V_S$ is maintained at the warn-blinker output 6, when the warn-blinker switch 20 is closed and the blinker lamps 19, 19' are lit, whereby the circuit sections 27 to 34 are maintained in their switched-on state.

Further, the high signal present at the output of the signal holding circuit 29 and thus on the conductors 39, 35B, makes sure that the frequency step-up circuit 33 does not increase the frequency when one or more blinker lamps 19 have failed because a frequency step-up takes place only when failed blinker lamps are present during the operational mode "directional blinking" to the right or left while the ignition is switched on. A frequency step-up does not take place during "warn-blinking". Furthermore, the high signal on the conductors 39, 35B makes sure that in the operational mode "warn-blinking" with the ignition switched off, the logic circuit 34 does not check whether, for example due to the hook-up of a trailer further blinker lamps 19 have been added to the blinker circuit as is the case in the normal blinking operation when the ignition is switched on and the switch 20 is switched off.

The operational state of the warn-blinker switch 20 is checked during each dark phase. As long as the warn-blinker switch 20 is closed, a further light phase is caused after a dark phase has ended, for example, at the point of time $t_4$. This is accomplished in that the relay driver output 1 of the relay driver circuit 27 is again activated by a signal from the control unit 30 through the databus 41, for example at the point of time $t_5$.

For example the operational mode "warn-blinking" is switched off if at the point of time $t_6$ the warn-blinker switch 20 is opened. However, the high level holding signal in the holding circuit 29 is not instantly extinguished at the point $t_6$, but only when the dark phase that begins with the point of time $t_6$ has ended, for example at a point of time $t_7$. A reset signal is supplied to the signal holding circuit 29 by the control unit 30 through the conductor 38 at the point of time $t_7$ whereby the holding signal is extinguished and the voltage supply circuit 28 is switched off. If the warn-blinker switch 20 is opened during a light or lit phase, the currently existing light phase is first continued and then the following dark phase is completed before the holding signal in the holding signal circuit 29 is extinguished.

It is an advantage that the present the warn-blinking circuit arrangement for a vehicle has been realized in an integrated circuit with but eight terminals. Further, the present circuit is especially distinguished by its very small quiescent current of 10 $\mu$A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An electronic blinker for a vehicle, said blinker comprising an input comparator circuit (26) having a warn-blinking input (6) and a reference input (42), a warn-blinker switch (20) connected to said warn-blinking input (6), a threshold signal supply connected to said reference input (42), a voltage supply circuit (28) with a terminal (2) for connection to a battery as a voltage supply for the electronic blinker, a relay driver circuit (27) having an input connected to said supply circuit (28) and a relay driving output (1) for controlling a blinker relay (17), further including a control unit (30) for the timed open loop blinking control of light and dark phases of blinker lamps (19), said input comparator circuit (26) having an output connected through a first conductor (36) to said voltage supply circuit (28) when said warn-blinker switch (20) is closed for supplying an operating voltage to said relay driver circuit, a signal holding circuit (29) connected to said output of said input comparator circuit (26) through said first conductor (36), said signal holding circuit (29) being adapted for setting a holding signal during light phases when said warn-blinker switch (20) is closed, a databus (41) connecting said control unit (30) to said relay driver circuit (27) for controlling a timing sequence of light and dark phases, a second conductor (38) connecting said control unit (30) to said signal holding circuit (29) for resetting said holding signal when the warn-blinker switch (20) is open, and wherein said signal holding circuit (29) is connected through a third conductor (39) to said voltage supply circuit (28) for maintaining said voltage supply when said holding signal is set and for switching-off said voltage supply when said holding signal is reset.

2. The circuit arrangement of claim 1, further comprising a frequency step-up circuit (33) including a decoding matrix, a third conductor (39) connecting said signal holding circuit (29) to said frequency step-up circuit (33) for supplying a signal to said frequency step-up circuit (33), whereby a frequency step-up is avoided during the operational mode: "warn-blinking" when blinker lamps (19) have failed.

3. The circuit arrangement of claim 2, further comprising a logic circuit (34) including a memory, wherein said signal holding circuit (29) is also connected through said third conductor (39) to a logic circuit (34) including a memory for supplying a signal to said logic circuit (34), whereby in the operational mode "warn-blinking" additionally connected blinker lamps (19) do not increase a failed lamp control threshold.

4. The circuit arrangement of claim 1, further comprising a contact debouncing circuit (32) connected between said output of said input comparator circuit (26) and said signal holding circuit (29).

5. The circuit arrangement of claim 4, wherein said contact debouncing circuit (32) comprises a digital debouncing circuit including series connected flip-flop circuits interconnected with a corresponding intermeshing of their respective outputs.

6. The circuit arrangement of claim 5, further comprising a clock signal generator (31) connected through a fourth connector (40) to said digital contact debouncing circuit (32) and to said control unit (30) (CPU).

7. The circuit arrangement of claim 1, wherein testing of the position of said warn-blinker switch (20) takes place during dark phases when the blinker lamps (19) are switched off.

8. The circuit arrangement of claim 1, further comprising an eight terminal housing, and wherein all circuit components recited are realized as an integrated circuit (16) which is arranged in said eight terminal housing.

* * * * *

UNITED STATES PATENT AND TRADEMARK OFFICE
CERTIFICATE OF CORRECTION

PATENT NO. : 6,028,512
DATED : Feb. 22, 2000
INVENTOR(S) : Schropp et al.

Page 1 of 4

It is certified that error appears in the above-indentified patent and that said Letters Patent is hereby corrected as shown below:

Title page, item [54] after BLINKER insert --AND HAZARD FLASHER--.

On the Title Page, under [57] ABSTRACT,
    line 1, after "blinker", insert --and hazard flasher--;
    line 5, after "manual", insert --hazard--;
    line 6, before "switch", delete "warn-blinker";
    line 7, after "blinker" insert --and hazard flasher--.
Col. 1, line 1, after "BLINKER", insert --AND HAZARD FLASHER--;
    following line 2, and above line 3, insert the following:
        --CROSS REFERENCE TO RELATED PATENT
        This application is related to U. S. Patent 5,805,061 (Fritz et al.) issued on September 8, 1998--;
    line 4, after "blinker", insert --and hazard flasher--;
    line 5, after "a" (second occurrence), delete "warn";
    line 6, before "function", replace "blinking" by --hazard flashing--;
    line 10, after "blinker", insert -- or flasher --.
    line 17, before "switch", replace "warn-blinker" by --hazard--;
    line 22, after "mode", delete " "warn-";
    line 23, before "is", replace "blinking" " by --hazard flashing --;
    line 25, before "lamps", replace "warn-blinking" by --hazard flashing--;
    line 27, before "switch", replace "warn-blinker" by --hazard--, before "lamps", replace "warn-blinking", by --hazard flashing--;
    line 32, before "switch", replace "warn-blinker" by --hazard--;
    line 34, before "switch", replace "warn-blinker" by --hazard--;
    line 35, before "switch", replace "warn-blinking" by --hazard flashing--;
    line 36, after "mode", replace " "warn-blinking", by --hazard flashing--;
    line 41, after "mode", replace " "warn-blinking", by --hazard flashing--;
    line 42, before "switch", replace "warn-blinker" by --hazard--;
    line 43, after "mode", replace " "warn-blinking", by --hazard flashing--;

UNITED STATES PATENT AND TRADEMARK OFFICE
CERTIFICATE OF CORRECTION

PATENT NO. : 6,028,512

DATED : Feb. 22, 2000

INVENTOR(S) : Schropp et al.

It is certified that error appears in the above-identified patent and that said Letters Patent is hereby corrected as shown below:

| | | |
|---|---|---|
| Col. 1, | line 50, | before "switch", replace "warn-blinker" by --hazard--; |
| | line 55, | after "mode", replace " "warn-blinking" " by --"hazard flashing"--; |
| | line 61, | after "mode", replace " "warn-blinking" " by --"hazard flashing"--; |
| Col. 2, | line 1, | after "electronic", replace "blinker" by --hazard flasher--, after "for", replace "warn-blinking" by --generating a hazard flashing--; |
| | line 13, | after "blinker", insert --and flasher--; after "a", replace "warn-" by hazard flashing--; |
| | line 14, | before "capability", delete "blinking"; |
| | line 16, | after "a" (first occurrence), replace "warn-blinker" by --hazard flasher--; |
| | line 17, | before "switch", replace "warn-blinker" by --hazard--; |
| | line 26, | before "switch", replace "warn-blinker", by --hazard--; |
| | line 29, | after "the", replace " warn-", by --hazard--; |
| | line 30, | before "switch", delete "blinker"; |
| | line 35, | before "switch", replace "warn-blinker", by --hazard--; |
| | line 42, | after "blinker", insert --and hazard flasher--; |
| | line 44, | before "switch", replace "warn-blinker", by --hazard--; |
| | line 54, | before "component", replace "warn-blinker" by --hazard flashing--; |
| | line 56, | after "present", replace "warn-blinker" by --hazard flashing--; |
| | line 61, | after "mode", replace " "warn-blinking" " by --"hazard flashing"--; |
| Col. 3, | line 2, | after "a", replace "warn-blinker" by--hazard--; |
| | line 13, | after "blinker", insert --and flasher--; |
| | line 23, | before "input", (first occurrence), replace "warn-blinker" by --hazard flashing--; |
| | line 44, | before "switch", delete "or warn-blinker"; |
| | line 53, | before "improvement", replace "warn-blinker" by --hazard flashing--; |

UNITED STATES PATENT AND TRADEMARK OFFICE
CERTIFICATE OF CORRECTION

PATENT NO. : 6,028,512

DATED : Feb. 22, 2000

INVENTOR(S) : Schropp et al.

It is certified that error appears in the above-identified patent and that said Letters Patent is hereby corrected as shown below:

Col. 3, line 55, after "mode", replace " "warn-" " by --"hazard flashing"--;
       line 56, before "according", delete " "blinking";
       line 59, after "the", delete "warn-";
       line 60, before "input", replace "blinker" by --hazard flashing--;
       line 61, before "hazard", delete "warn-blinker or" ;
       line 62, after "mode", replace " "warn-blinking" " by --"hazard flashing"--;

Col. 4, line 44, after "mode:", replace "warn-blinking" by --hazard flashing--;
       line 46, before "input", replace "warn-blinking" by --hazard flashing--;
       line 51, after "mode", replace " "warn-blinking" " by --hazard flashing--;
       line 54, before "switch", replace "warn-blinker" by --hazard--;
       line 58, before "switch", replace "warn-blinker" by --hazard--;
       line 60, before "input", replace "warn-blinker" by --hazard flashing--;
       line 62, before "switch", replace "warn-blinker" by --hazard--;

Col. 5, line 30, before "switch", replace "warn-blinker" by --hazard--;
       line 34, before "output", replace "warn-blinker" by --hazard--, after "the" (second occurrence), delete "warn-";
       line 35, before "switch", replace "blinker" by --hazard--;
       line 46, before ".", replace "warn-blinking", by --hazard flashing--;
       line 48, after "mode", replace " "warn-blinker" " by --"hazard flashing"--;
       line 54, before "switch", replace "warn-blinker" by --hazard--;
       line 56, after "the", replace "warn-blinker" " by --"hazard"--;
       line 63, after "mode", replace " "warn-blinking" " by--hazard flashing--;
       line 64, before "switch", replace "warn-blinker" by --hazard--;

Col. 6, line 10, after "the" (second occurrence), replace "warn-blinking" by --hazard flashing--;
       line 22, after "electronic", replace "blinker" by --flasher--, after "said", replace "blinker" by --flasher--;
       line 23, after "a", replace "warn-" by --hazard flashing--;

UNITED STATES PATENT AND TRADEMARK OFFICE
CERTIFICATE OF CORRECTION

PATENT NO. : 6,028,512

DATED : Feb. 22, 2000

INVENTOR(S) : Schropp et al.

It is certified that error appears in the above-identified patent and that said Letters Patent is hereby corrected as shown below:

Col. 6, line 24, before "input" (first occurrence), delete "blinking", after "a" (second occurrence), replace "warn-blinker" by --hazard--;
line 29, before ",", replace "blinker" by --flasher--;
line 36, before "switch", replace "warn-blinker" by --hazard--;
line 41, after "said", replace "warn-blinker" by --hazard--;
line 47, before "switch", replace "warn-blinker" by --hazard--;
line 53, before"of", replace "circuit arrangement" by --electronic flasher--;
line 59, before "when", replace "warn-blinking" by --hazard flashing--;
line 60, after "The", replace "circuit arrangement" by --electronic flasher--;
line 65, after "mode", replace " "warn-blinking" " by --hazard flashing--;

Col. 7, line 1, after "The", replace "circuit arrangement" by --electronic flasher--;
line 5, after "The", replace "circuit arrangement" by --electronic flasher--;
line 10, after "The", replace "circuit arrangement" by --electronic flasher--;

Col. 8, line 3, after "The", replace "circuit arrangement" by --electronic flasher--;
line 4, after "said", replace "warn-blinker" by --hazard--;
line 7, after "The", replace "circuit arrangement" by --electronic flasher--;
line 8, after "all", insert --recited--;
line 9, after "nents", delete "recited".

Signed and Sealed this

Twenty-seventh Day of March, 2001

Attest:

NICHOLAS P. GODICI

Attesting Officer

*Acting Director of the United States Patent and Trademark Office*